Oct. 27, 1936. W. L. MORRISON 2,059,015
WINDOW FOR VEHICLES
Filed Dec. 5, 1932   3 Sheets-Sheet 1

Inventor
Willard L. Morrison
By Parker & Carter Attys.

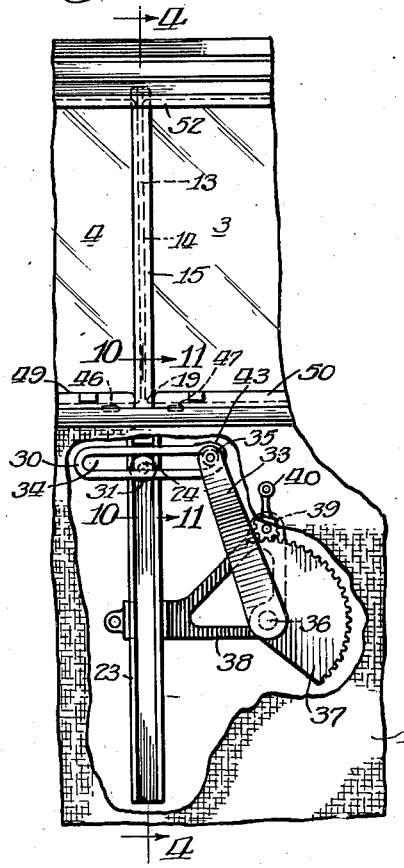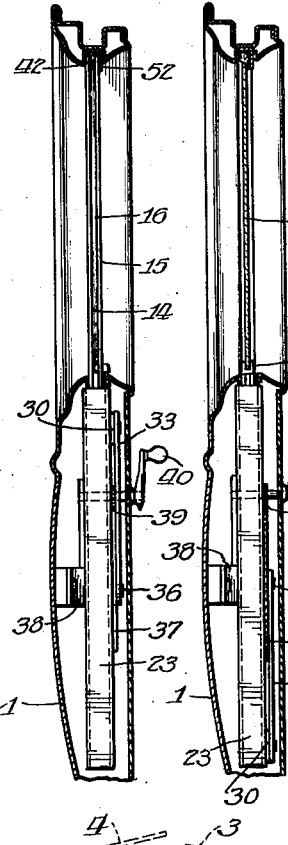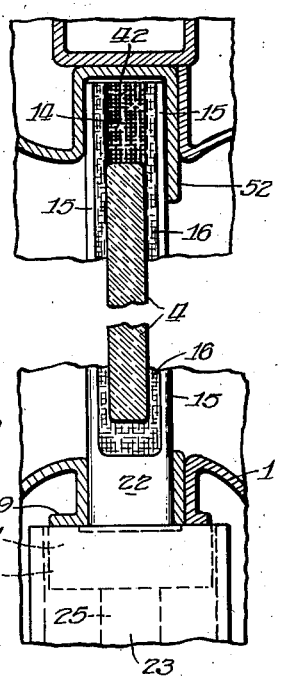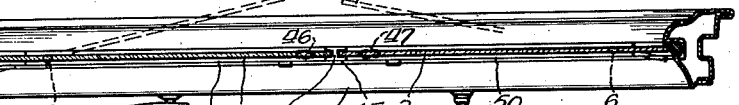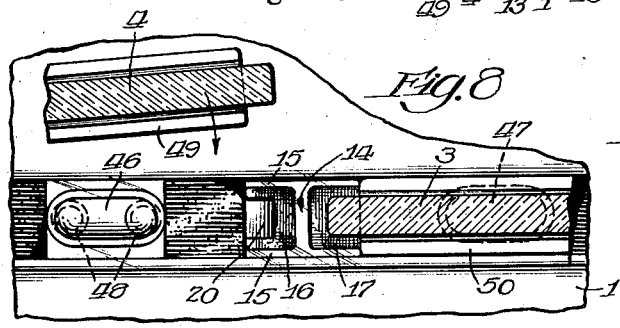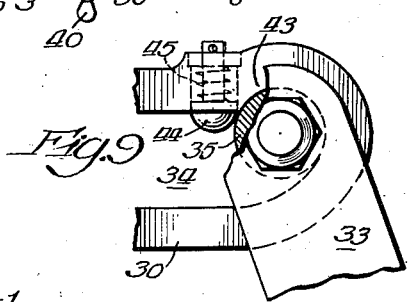

Oct. 27, 1936.                    W. L. MORRISON                    2,059,015
                                  WINDOW FOR VEHICLES
                              Filed Dec. 5, 1932          3 Sheets-Sheet 3
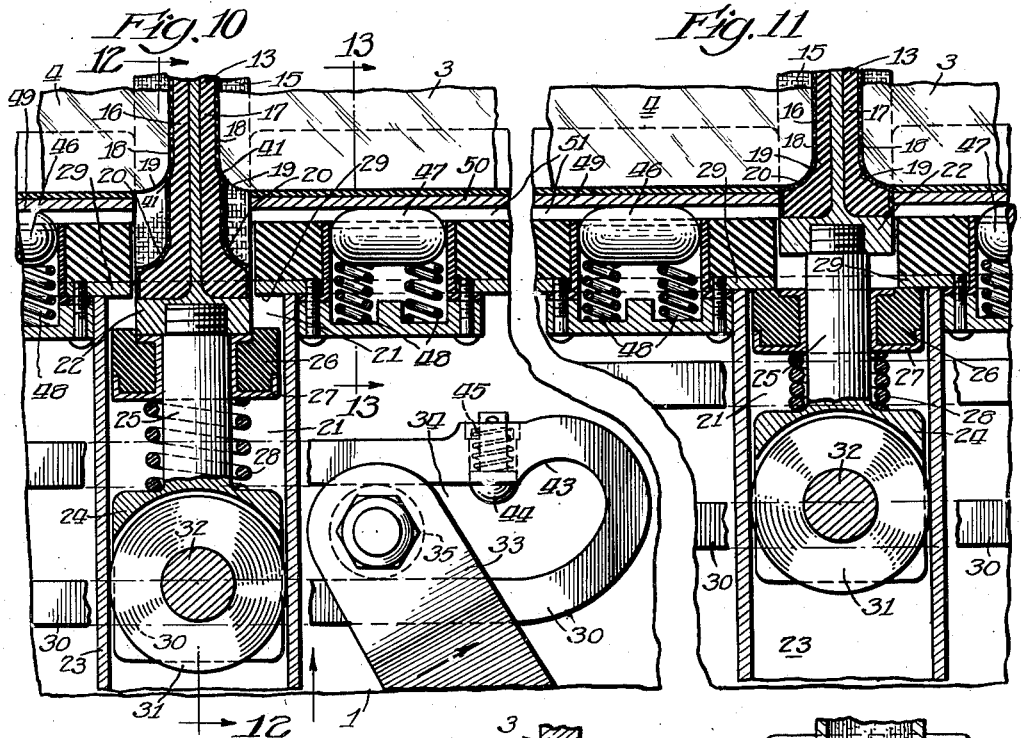
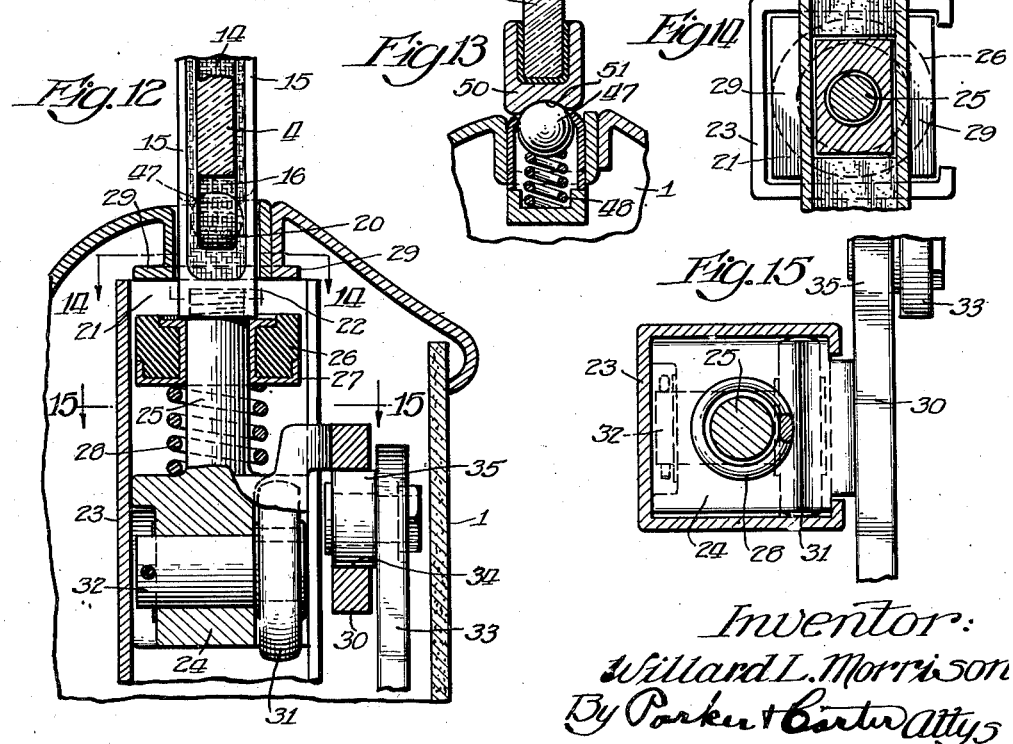
Inventor:
Willard L. Morrison
By Parker + Carter Attys Patented Oct. 27, 1936

2,059,015

UNITED STATES PATENT OFFICE 2,059,015

WINDOW FOR VEHICLES

Willard L. Morrison, Chicago, Ill.

Application December 5, 1932, Serial No. 645,685

10 Claims. (Cl. 296—44)

This invention relates to windows for vehicles and has for its object to provide a new and improved device of this description. The invention has as a further object to provide a split window which may be used either as a window or an air deflector. The invention has as a further object to provide a window of this description with a sealing device separate from the window sections for sealing the space between them. The invention has as a further object to provide a window of this description with mechanically actuated means for sealing and unsealing the space between the two sections of the split window. The invention has as a further object to provide means for accurately aligning the two sections of the split window when in its closed position. The invention has as a further object to provide means for inserting the sealing device between the two sections of the split window after they are aligned. The invention has further objects which are more particularly pointed out in the accompanying description.

Referring now to the drawings, Fig. 1 is a view of a vehicle showing one form of the invention;

Fig. 3 is an enlarged view showing the edges of the split window and the sealing device in its operative or sealing position;

Fig. 4 is a sectional view taken on line 4—4 of Fig. 3;

Fig. 5 is a sectional view taken on line 5—5 of Fig. 2;

Fig. 6 is an enlarged sectional view with parts broken away showing the upper and lower edges of one of the glass sections;

Fig. 7 is a sectional view taken on line 7—7 of Fig. 2;

Fig. 8 is a view in part section showing the top view of the aligning device for the window sections; taken on line 8—8 of Fig. 2;

Fig. 9 is an enlarged view showing the position of the actuating lever for the sealing device when the sealing device is in its sealing position;

Fig. 10 is an enlarged vertical sectional view showing the sealing device and associated parts between the lines 10—11 and 10—11 of Fig. 3 with the sealing device before it has reached its final sealing position;

Fig. 11 is a view similar to Fig. 10 showing the sealing device in its final sealing position;

Fig. 12 is a sectional view taken on line 12—12 of Fig. 10;

Fig. 13 is a sectional view taken on line 13—13 of Fig. 10;

Fig. 14 is a sectional view taken on line 14—14 of Fig. 12;

Fig. 15 is a sectional view taken on line 15—15 of Fig. 12.

Like numerals refer to like parts throughout the several figures.

Figure 1:
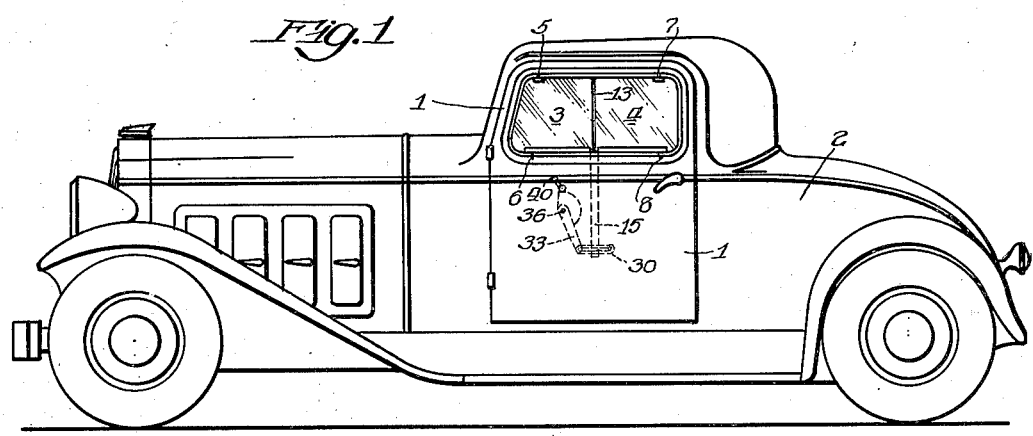
Figure 2:
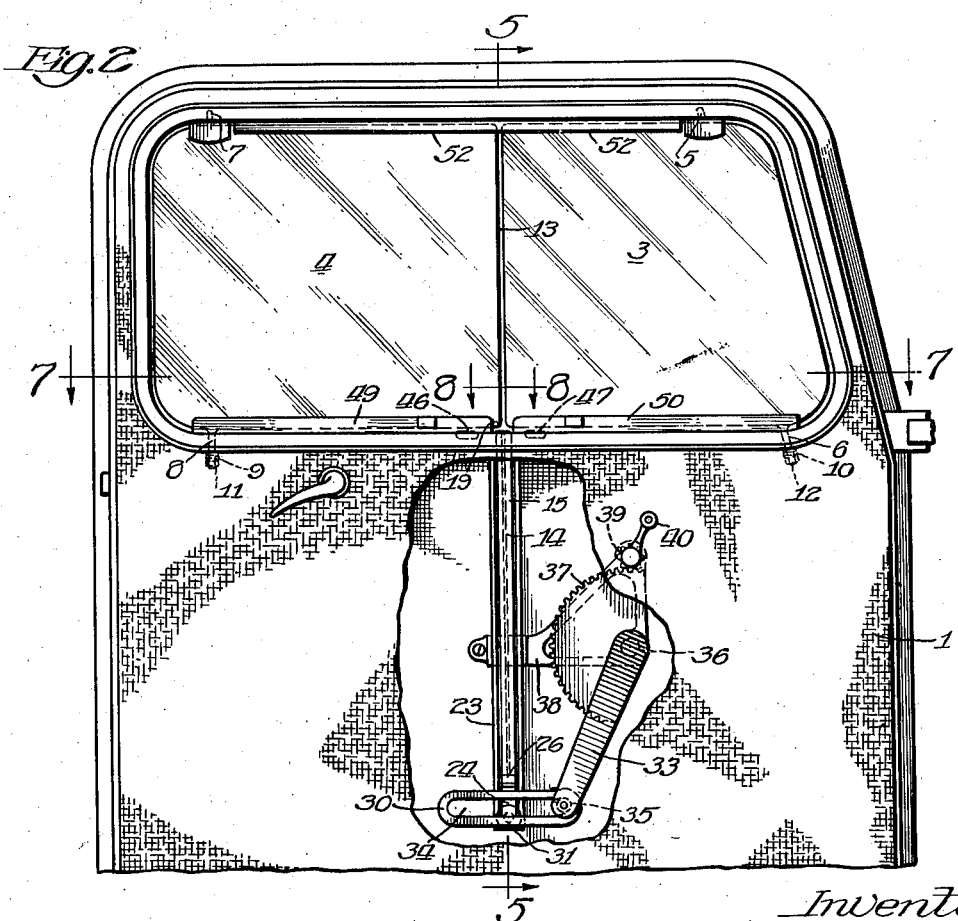
Fig. 2 is an enlarged view of the window and associated parts illustrated in Fig. 1 with parts broken away showing the sealing device for the space between the window sections in its inoperative or unsealing position.

Referring now to the drawings, I have illustrated the invention as shown in connection with a vehicle, such as an automobile. The window may be located in any desired position. As here shown it is located in the window space of the door 1 in the automobile 2. The window consists of the sections 3 and 4 which are pivoted, preferably at their opposite ends, to the window frame. In the construction shown the section 3 is pivoted at 5 near its front end to the upper portion of the window frame, and at 6 to the lower portion of the window frame. These pivotal connections are near the front edge of the window section. The section 4 is pivoted at 7 to the upper portion of the window frame, and at 8 to the lower portion thereof. By means of these pivots the front section 3 may be moved about its pivots so that the rear edge thereof projects, if desired, beyond the plane of the window. The rear section 4 may be moved about its pivots so that the front edges thereof project beyond the plane of the window.

Some means is provided for holding these sections in any position to which they may be moved. As herein shown this is accomplished by means of a spring 9 and 10 associated with pivots 6 and 8, there being nuts 11 and 12 for adjusting the compression of the springs. It will be seen that when the nuts 11 and 12 are tightened up the springs produce a resistance to the movement of the sections 3 and 4, and by properly adjusting these springs these sections may be maintained in any position to which they are moved. The two sections 3 and 4, when they are to be used as the window, are brought together with their edges abutting so as to be in substantially the same vertical plane.

Some means is provided for sealing the space 13 between the two window sections. One form of sealing device herein illustrated consists of a rigid eye member having a central portion 14 which is inserted between the adjacent edges of the glass sections, and the outer portions 15 which extend laterally along the inner and outer faces of the glass sections. This rigid member may be made of metal or any other suitable material. Located between the outer portions 15 are the window engaging portions 16 and 17. These window engaging portions are attached to and form a part of the sealing member and may be made of any suitable sealing material. As herein illustrated the window engaging portions 16 and 17 are made of some comparatively soft material, such as rubber or the like, covered by a flexible material 18 such as cloth and is moved down into a receiving chamber when in its inoperative position. The lower adjacent corners of the sections 3 and 4 are preferably rounded as shown at 19. The lower ends of the engaging portions of the sealing member are enlarged as illustrated at 20 and shaped so as to fit the rounded edges 19 of the window sections, forming a tight seal at the lower edges of said sections.

The lower end of the rigid or eye member is provided with an enlargement 22, see Figs. 10 and 11, upon which the enlarged ends 20 of the engaging portions 16 and 17 are received. Some means is provided for raising and lowering the sealing member. As herein shown the sealing member when lowered moves into the guiding device 23 so that it will be held in the proper position to be moved into the space between the adjacent edges of the window sections 3 and 4. In order to move the sealing member there is provided a sliding piece 24 sliding in the guide 23, and having a member 25 which is connected with the enlarged end 22 of the rigid portion of the sealing member. Surrounding the member 25 is a sealing device 26 for sealing the top of the chamber 21 when the sealing member is in its sealing position. This sealing device consists of a soft piece of suitable sealing material contained in a sleeve 27 which surrounds the member 25. A spring 28 is inserted between the sliding member 23 and the sealing device 26. When the sealing member is moved up to its sealing position, the sealing device 26 engages the part 29 surrounding the opening in the chamber 21 and seals said opening. The sealing device 26 engages the part 29 before the sealing member reaches its final position so that the spring 28 is compressed, as shown in Fig. 11, to hold the sealing device 26 in a tight sealing position. The sliding member 24 is moved up and down in the guiding device 23 by some suitable mechanism.

As herein shown a slotted member 30 is connected with the sliding member 23. A friction reduction member 31 mounted on a pin 32 in the sliding member 23. An arm 33 is provided with a part which projects into the slot 34 of the slotted member 30. This part is preferably provided with a roller 35. The arm 33 is pivotally connected at 36 with a rocking member which is shown as a segmental gear 37. This is shown pivotally connected to the member 38 fixed in position in any desired manner. As herein shown it is attached to the guiding device 23. A pinion 39 engages the segmental rack 37 and is actuated by a crank 40 on the inside of the door. When the crank is turned in one direction, the slotted member 30 moves the sealing member up in between the sections 3 and 4, see Fig. 3. There is preferably a tight fit of the sealing member with the glass sections, the material giving as the sealing member is moved upwardly as shown at 41 in Fig. 10, so as to insure a tight sealing of the space between the two sections 3 and 4. When the sealing device is moved up to its uppermost position the upper end is received in a recess 42, see Fig. 6, and this holds the sections 3 and 4 positively in position and prevents the window from being opened by pressure applied thereto. When the crank is moved in the other direction the sealing member is moved downwardly from between the glass sections 3 and 4 so as to release them and they may then be moved out to any angular position desired.

Means is preferably provided for preventing the sealing device from being moved down accidentally, as by the jarring of the vehicle, or for any other reason. This means consists of providing the slot 34 of the slotted member 20 with an upturned portion 43, see Fig. 9, into which the roller 35 is received when the sealing device is in its uppermost position. There is also preferably provided a spring pressed detent or member 44 at the edge of the upturned portion of the slot which has a rounded head and which is normally pressed downwardly by a spring 45. When the roller 35 is in the upturned portion of this slot, as shown in Fig. 9, it will be seen that downward pressure applied to the sealing device cannot move it downward, but that pressure applied to the arm 33 by a crank 40 easily moves the roller 35 into the straight portion of the slot 34.

Some means is preferably used for properly aligning the two glass sections with relation to the sealing device so as to insure that the sealing device, when moved up, will move in proper position between the two glass sections. This may be accomplished, for example, by providing the spring pressed members 46 and 47 in the bottom of the window frame which are pressed upwardly by the springs 48, but which are prevented from moving out of their receiving chambers. These members are rounded at the top and project somewhat above the bottom portion of the window frame. The sections 3 and 4 have at the bottom thereof the framing pieces 49 and 50 to which the pivots 6 and 8 are connected. These framing pieces are provided with recesses 51, see Fig. 13, so that when moved over the members 46 and 47 these members will move downwardly and then will move up into the recesses 51 so as to hold the sections 3 and 4 in proper alignment. A slight pressure on the inside of the members will disconnect them and permit them to be moved out to angular positions. The inward movement of the sections 3 and 4 at the top is limited by the stop pieces 52 which are attached to the upper part of the window frame.

I claim:

1. A window for vehicles having a door with a window opening therein and comprising two window sections for the window opening, the two sections being movably mounted in position on said door in said window opening and having their edges adjacent when in their closed position, a movable sealing device intermediate the front and rear edges of said door and adapted to be inserted between the adjacent edges of the window sections to seal the space between them and to be withdrawn therefrom the sealing device adapted to be withdrawn downwardly below the lower edge of said window opening when the window sections are to be moved, and a controlling mechanism separate from the sealing device for moving said sealing device into and out of its sealing position.

2. A window for vehicles having a window opening comprising two window sections for the window opening, the two sections being movably mounted in position and having their edges adjacent when in their closed position, a movable sealing device on said vehicle and associated with said window sections and adapted to be inserted between the adjacent edges of the window sections to seal the space between them and to be withdrawn therefrom when the window sections are to be moved, and a controlling mechanism separate from the sealing device for moving said sealing device into and out of its sealing position, said sealing device locking the window sections against movement when the sealing device is in its sealing position.

3. A window for vehicles having a door with a window opening therein and comprising two window sections for the window opening, the two sections being movably mounted in position on said door in said window opening and having their edges adjacent when in their closed position, a movable sealing device intermediate the front and rear edges of said door and adapted to be inserted between the adjacent edges of the window sections to seal the space between them and to be withdrawn therefrom the sealing device adapted to be withdrawn downwardly below the lower edge of said window opening when the window sections are to be moved, and means for indicating when said window sections are in alignment so that their adjacent edges will be in proper position for the sealing device.

4. A window for vehicles having a door with a window opening therein and comprising two window sections for the window opening, the two sections being movably mounted in position on said door in said window opening and having their edges adjacent when in their closed position, a movable sealing device intermediate the front and rear edges of said door and adapted to be inserted between the adjacent edges of the window sections to seal the space between them and to be withdrawn therefrom the sealing device adapted to be withdrawn downwardly below the lower edge of said window opening when the window sections are to be moved, a guiding device below the window space into which said sealing device is received.

5. A window for vehicles having a door with a window opening therein and comprising two window sections for the window opening, the two sections being movably mounted in position on said door in said window opening and having their edges adjacent when in their closed position, a movable sealing device intermediate the front and rear edges of said door and adapted to be inserted between the adjacent edges of the window sections to seal the space between them and to be withdrawn therefrom the sealing device adapted to be withdrawn downwardly below the lower edge of said window opening when the window sections are to be moved, a guiding device below the window space into which said sealing device is received, a crank for controlling said sealing device, and an operative connection between said crank and the sealing device, a support for said crank and a connection between said support and said guiding device.

6. A window for vehicles having a door with a window opening therein and comprising two window sections for the window opening, the two sections being movably mounted in position on said door in said window opening and having their edges adjacent when in their closed position, a movable sealing device intermediate the front and rear edges of said door and adapted to be inserted between the adjacent edges of the window sections to seal the space between them and to be withdrawn therefrom the sealing device adapted to be withdrawn downwardly below the lower edge of said window opening when the window sections are to be moved, the sealing device being received in a receiving space below the window opening when in its inoperative position, and means for sealing the upper end of this receiving space when the sealing device is in its operative position.

7. A window for vehicles having a window opening comprising two window sections for the window opening, the two sections being movably mounted in position and having their edges adjacent when in their closed position, a movable sealing device on said vehicle and associated with said window sections and adapted to be inserted between the adjacent edges of the window sections to seal the space between them and to be withdrawn therefrom when the window sections are to be moved, a controlling mechanism below the window space for moving said sealing device into and out of its operative position, and means associated with said controlling mechanism for preventing the sealing device from being moved out of its operative position by downward pressure thereon.

8. A window for vehicles having a window opening comprising two window sections for the same window opening, the two sections being pivotally mounted so that they may be moved to angular positions or in aligning position with a space between them to close them, automatic elastic aligning devices associated with the window opening for stopping the window sections when in their aligning position.

9. A window for vehicles comprising a window opening, two window sections for the window opening pivotally mounted therein and having their ends adjacent and separated by a space when in their closed positions, a removable sealing device between the adjacent edges to seal the space between them, an actuating device for sliding said sealing device along the adjacent edges of the window sections to remove it and means for holding said sealing device, when removed from between the window sections, in a fixed position below the window opening while the window sections are being moved to different angular positions.

10. A window for vehicles comprising a window opening, two window sections for the window opening pivotally mounted therein and having their ends adjacent and separated by a space when in their closed positions, a removable sealing device between the adjacent edges to seal the space between them, an actuating device for sliding said sealing device along the adjacent edges of the window sections to remove it, and means associated with said actuating device, for preventing the sealing device from being accidentally slid out of position.

WILLARD L. MORRISON.